3,035,026
METAL CONTAINING POLYESTER RESIN
James R. Stephens, Gary, Ind., assignor to Standard Oil
Company, Chicago, Ill., a corporation of Indiana
No Drawing. Filed Aug. 31, 1959, Ser. No. 836,891
6 Claims. (Cl. 260—75)

This invention relates to water insoluble metal salts of a polyester resin which are particularly suitable for impregnating cellulosic fibers.

It has been discovered that metal containing polyester resins which are particularly suitable for the impregnation of cellulosic and other adsorbent fibers can be prepared by reacting a hereinafter defined water soluble polyester resin and a metal salt having appreciable solubility in water; the metal ion present in the metal salt is characterized by the ability to react with the water soluble polyester resin to produce a water insoluble metal salt thereof.

The water soluble polyester resin is the reaction product of $(a)(i)$ a polyesterification-condensation reaction product and $(a)(ii)$ an alkaline reacting material.

The polyesterification-condensation reaction product is characterized by an Acid Number (Mg.KOH per g.) of at least about 20, and by an ability to form a thermoset solid upon exposure to temperatures in the region of 150°–200° C. The polyesterification-condensation reaction is carried out between benzene tricarboxylic acids and their anhydrides—these contain only carboxyl substituents—and an alkylene glycol or mixtures thereof. The defined glycol and the defined acid or anhydride are reacted in a mole ratio between about 0.6 and about 1.5. Cross linking is avoided by controlling the reaction temperature at between about 100° and about 240° C. and for a time which time is related to the reaction temperature. The course of the reaction is characterized by an abrupt change in viscosity of the material in the reaction vessel. This abrupt viscosity increase immediately precedes a very viscous state leading to gelation—gelation here is commonly known as the appearance of an objectionable amount of cross linking. The reaction is stopped just short of the abrupt viscosity increase point. It is to be understood that in other respects, the polyesterification-condensation reaction is carried out at the usual conditions, such as, operating in an inert atmosphere and continous withdrawal of water produced in the reaction.

This polyesterification-condensation involves a benzene tricarboxylic acid containing only carboxyl substituents and/or anhydrides of these acids. The defined acidic members are trimellitic acid, trimellitic anhydride, trimesic acid, hemimellitic acid and hemimellitic anhydride. Trimellitic anhydride and trimesic acid are preferred acidic members. Mixtures of the defined acidic members may be used; in general, it is preferable to operate with single compounds because the reaction conditions for each compound are somewhat different, even though falling within the same broad conditions.

In addition to the above defined acid (anhydride) the reaction involves an alkylene glycol. It is to be understood that the term "alkylene glycol" includes the glycols containing only hydroxyl groups and those including ether linkage as well as the hydroxyl groups. Exceptionally good results are obtained using the alkylene glycols containing from 2 to 9 carbon atoms. These glycols may also be described as methylene glycols containing not more than 9 carbon atoms, polyethylene glycols containing not more than 8 carbon atoms, and polypropylene glycols containing not more than 9 carbon atoms. Illustrative glycols suitable for use in the invention are: ethylene glycol, propylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, 1,3-butanediol, 2,3-butanediol 2,4-pentanediol, 2,5-hexanediol, 2-methyl-1,3-pentanediol, 2-methyl-2,4-pentanediol, 2,3-dimethyl-2,3-butanediol, 2, 2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, tripropylene glycol.

The Acid Number of the particular reaction product is dependent upon the mole ratio of glycol to acidic member charged and also to some extent on the particular reactants charged, also upon the closeness of the approach to "complete" reaction of the particular acidic member and glycol. In the case of the preferred lower molecular weight glycols, i.e., those containing not more than 9 carbon atoms, a mole ratio of glycol to acidic member of about 1.5 will produce an Acid Number in the region of 20. A mole ratio of glycol to acidic member of about 0.6 is about the limit for utility; this ratio produces a polyester having an Acid Number on the order of 400. An equimolar ratio will produce an Acid Number on the order of 240. It is to be understood that these Acid Numbers are illustrative only and will vary with the particular glycol charged and with the closeness of the approach to the abrupt viscosity increase point in the reactions.

It is to be understood that, in addition to the free carboxyl groups, the polyester will contain free hydroxyl groups. The number of free hydroxyl groups is determined, like the free carboxyl groups, by the particular ratio of reactants and the completeness of the reaction—for convenience, the polyesterification-condensation reaction product is characterized by Acid Number. In general, when operating with trimellitic anhydride or trimesic acid and the defined lower molecular weight glycols, it is preferred to use a ratio of glycol to acidic member between 0.9 and 1.3.

It is to be understood that the reaction is carried out in an inert atmosphere with continuous withdrawal of the water produced in the reaction. The reaction may be carried out in the presence of a catalyst or in the absence of a catalyst. The desired product is obtained utilizing between about 100° and about 240° C. Somewhat higher temperatures may be used, but these require very careful control of the reaction time to avoid undesired cross linking.

Control of the time of the materials in the reaction zone is necessary to the attainment of the polyester of the invention. The instant method of reaction passes through an abrupt viscosity increase just prior to the formation of appreciable amounts of gelled material. The abrupt increase in viscosity of the contents of the reactor is readily apparent by the appearance of the contents in glass equipment or the rate of drop from a stirring rod in case of metal equipment. Even in situations where the appearance of the reactor contents cannot be observed visually, a trial run or two quickly establishes the abrupt viscosity increase point for the particular reactants and the particular temperature of reaction being used. (The instant reaction may be likened to the preparation of a white sauce using fat, flour and milk wherein a comparatively long period of fluidity in the sauce pan is followed by a seemingly instantaneous thickening or even solidification of the contents of the pan. The abrupt viscosity increase point of this reaction corresponds to this sharp rise in thickness of the white sauce.) The polyesterification-condensation reaction is carried out at the particular temperature for a time just short of the abrupt viscosity increase point, which point is characteristic of the particular reactants.

The reaction of trimellitic anhydride and the defined lower molecular weight alkylene glycols is susceptible to a more particularized relationship of time and temperature. In general, at the temperature of about 240° C., the reaction will have gone as far as desired in about 30 minutes. On the other hand, at the temperature of about 100° C., the reaction will take about 10 hours to reach the desired completion point. To illustrate further, at about 200° C., the time may be on the order of 1.5 hours, and at 140° C., about 4 hours. Thus there is an inverse time, temperature relationship, where the longer maximum times correspond to the lower temperatures. In general, the system trimesic acid and lower alkylene glycols follows the same time, temperature relationship as does trimellitic anhydride, with the trimesic acid system requiring somewhat shorter times at a given temperature.

The water soluble polyester resin of the invention consists essentially of the resin product of the reaction of the polyester condensation reaction product resin and an alkaline reacting material. The reaction is carried on until enough of the acidity of the polyester resin is utilized to obtain a water soluble resin product. The degree of "neutralization" of the polyester resin required to impart solubility is dependent upon the type of polyester resin. In general, the higher polyols and particularly the alkylene ether glycols require the least degree of "neutralization." (It is to be understood that "neutralization" represents a reduction in Acid Number of the polyester resin.) The usage of alkaline reacting material may be beyond that needed to obtain the water soluble resin; in general, the usage is held to not more than the amount theoretically needed to react with all the acidity of the polyester resin. The water solution of water soluble resin may be on the alkaline side; however, it is preferred to maintain the solution on the acid side or neutral. The water solution of the water soluble resin obtained by neutralizing on the order of 90% of the acidity of the polyester resin is particularly suitable for surface coating applications. Usually, at least about 60% of the acidity of the polyester resin is needed to be neutralized in order to obtain high water solubility, as evidenced by the clarity of the aqueous solution. In general, the lower the Acid Number of the polyester resin, the greater the percentage of the acidity of that polyester resin, which must be neutralized to obtain the desired water solubility. To illustrate: a polyester resin made from trimellitic anhydride and ethylene glycol to an Acid Number of about 200 can be made water soluble by reacting about 60% of the acidity with aqueous ammonium hydroxide. On the other hand, a polyester resin from these reactants made to an Acid Number of about 50, will require neutralizing about 90% of the acidity to obtain high water solubility.

The alkaline reacting material may be any material which reacts with acidity to produce a more neutral product. Ammonium hydroxide alkali metal hydroxides alkali metal bicarbonates are particularly suitable when aqueous reaction medium is desired. The hydrocarbon amines, particularly those containing not more than 4 carbon atoms in each aliphatic group, are suitable. The amine alcohols, such as alkanolamines, are suitable. The heteroamines, such as morpholine, pyridine, and piperidine may be used. The type of alkaline reacting material used is determined in part by the characteristics desired in the final water soluble resin; also, by the type of polyester resin which is to be converted to a water soluble form.

The neutralization reaction is carried out by contacting the polyester resin and the alkaline reacting medium, when necessary in the presence of a liquid reaction medium; particularly suitable reaction mediums are oxygenated organic solvents for the resin and water. When water is used as the liquid reaction medium, it is preferred that it be warm, i.e., maintained in the region of 40–60° C.; the polyester resin is added to the aqueous alkaline reacting material and the two agitated until the polyester resin has passed into solution. Ammonium hydroxide solution is a particularly suitable aqueous alkaline medium. The water solutions of the water soluble resin are clear liquids or clear liquids containing some opalescent appearance which may or may not be colored.

The water soluble resin is converted to the water insoluble metal salt of the polyester by reaction with a suitable metal salt. This salt may be considered as MX where X is an ion capable of making MX appreciably soluble in water and M is an ion which forms a water insoluble salt of the "water soluble" polyester resin. The range of metals suitable is very broad; particularly suitable are the water soluble salts of barium, calcium, copper, iron, lead, mercury and silver. Sufficient of the defined metal salt is used to react with enough of the acid groups of the polyester to produce the desired water insoluble product. The final product may or may not have all the acid groups reacted with metal.

One illustrative embodiment of the water-soluble polyester resin was prepared as follows. The reaction was carried out in a flask provided with a mechanical stirrer and heated by means of a commercial electrical heating jacket. The water produced in the reaction was removed by means of a condenser provided with a Dean-Stark trap. Trimellitic anhydride prepared by thermal dehydration of trimellitic acid and containing about 95% of anhydride was charged to the flask in an amount of 0.50 mole. Commercial ethylene glycol was charged to the flask in an amount of 0.60 mole. The vessel was maintained at 100°–110° C. for a time of 9 hours with continuous removal of water product of esterification. The product was a colorless, brittle solid resembling glass.

A portion of the polyester product removed from the vessel was dissolved in acetone and further purified by reprecipitation from water; washing with cold water; and drying for several hours at 25° C. and 0.2 mm. Hg vacuum. This material was easily ground to a powder; the ground powder was held under vacuum at 60° C. to constant weight.

The inspections of the purified material were: Acid Number, 223; Hydroxyl Number, 25; Ester Number, 412; Saponification Number, 634. The purified polyester melted in the region 110°–120° C. It was readily soluble in acetone and films could be cast on glass and metal plates very readily from the acetone solution. A molecular weight was obtained by the ebullioscopic method in acetone, which molecular weight was 1810. The films baked at 200° C. for about 1 hour gave very hard, glossy coatings.

Ten grams of the solid polyester were stirred with 90 ml. of water at 50° C. and enough sodium bicarbonate to effect solution at the solid polyester. The amount of bicarbonate used produced an alkaline solution of the polyester. A film of the water solution was placed on a glass plate and baked at 140–150° C. for 2 hours. The baked film was very hard and resisted water spotting.

A. The aqueous solution of water soluble resin was poured slowly into an aqueous solution of calcium chloride. Immediately, a rope-like white precipitate formed. This resembled the precipitates obtained by extrusion of polymeric dope solutions into a coagulating bath.

B. The above precipitation procedure was repeated with barium chloride, lead nitrate, cupric acetate, cobaltic nitrate and mercuric acetate, respectively. In all cases white precipitates were obtained.

C. Strips of ordinary white cotton cloth and ordinary white bond paper were soaked for 1 hour in the aqueous solution of the water soluble resin. Excess solution was removed by pressing the soaked strip between filter papers. These strips were then soaked for 10 minutes in 5% aqueous BaCl$_2$ solution. In each case the water insoluble precipitate formed; inspection indicated complete impregnation of the fibers and paper. The impregnated cloth and the paper strips transmitted somewhat less direct light than did the untreated materials. Mechanical washing with water of the impregnated strips did not remove any appreciable amount of the insoluble resins from the material.

Thus having described the invention, what is claimed is:

1. A composition of matter consisting essentially of a water insoluble metal salt of a polyester resin which salt is obtained by reacting:
   (I) an aqueous solution of a polyester resin which solution is obtained by treating,
      (i) a polyester resin reaction product characterized by an Acid Number in the region of 20 to 400 and by an ability to form a thermoset solid upon baking at a temperature in the region of 150–200° C., which polyester resin is obtained by the polyesterification-condensation reaction of an acidic member selected from the class of benzene tricarboxylic acids containing only carboxyl substituents and the anhydrides thereof, with an alkylene glycol containing from 2 to 9 carbon atoms, in a mole ratio of said glycol to said acidic member of between about 0.6 and about 1.5, said condensation reaction being carried out at a temperature between about 100° and about 240° C., which condensation reaction is characterized by an abrupt increase in viscosity of the contents of the reaction zone, said condensation reaction being carried out for a time just short of said abrupt viscosity increase point, with
      (ii) an aqueous solution of an alkaline reacting material, said material being present in an amount sufficient to bring said polyester resin into solution in the aqueous solution, whereby an aqueous solution of said polyester resin is obtained; with
   (II) a metal salt, wherein the metal is selected from the class consisting of barium, calcium, copper, cobalt, iron, lead, mercury and silver, which metal salt has appreciable solubility in water and the metal ion thereof being capable of reacting with said water soluble polyester resin to produce a water insoluble metal salt of said polyester resin, said metal salt being added to said polyester resin containing aqueous solution, in an amount sufficient to precipitate a metal salt of said condensation product; whereby a water insoluble metal salt of the polyester resin is obtained.

2. The metal salt of the polyester resin of claim 1 wherein said acidic member is trimellitic anhydride.

3. The metal salt of the polyester resin of claim 1 wherein said glycol is ethylene glycol.

4. The metal salt of the polyester resin of claim 1 wherein said alkaline material is sodium bicarbonate.

5. The metal salt of the polyester resin of claim 1 wherein said metal is barium.

6. The metal salt of the polyester resin of claim 1 wherein said Acid Number is on the order of 240.

References Cited in the file of this patent

UNITED STATES PATENTS 2,562,878    Blair _____ Aug. 7, 1951